June 6, 1967  E. E. MURRAY  3,323,247
FISHING BOBBER
Filed Nov. 5, 1964
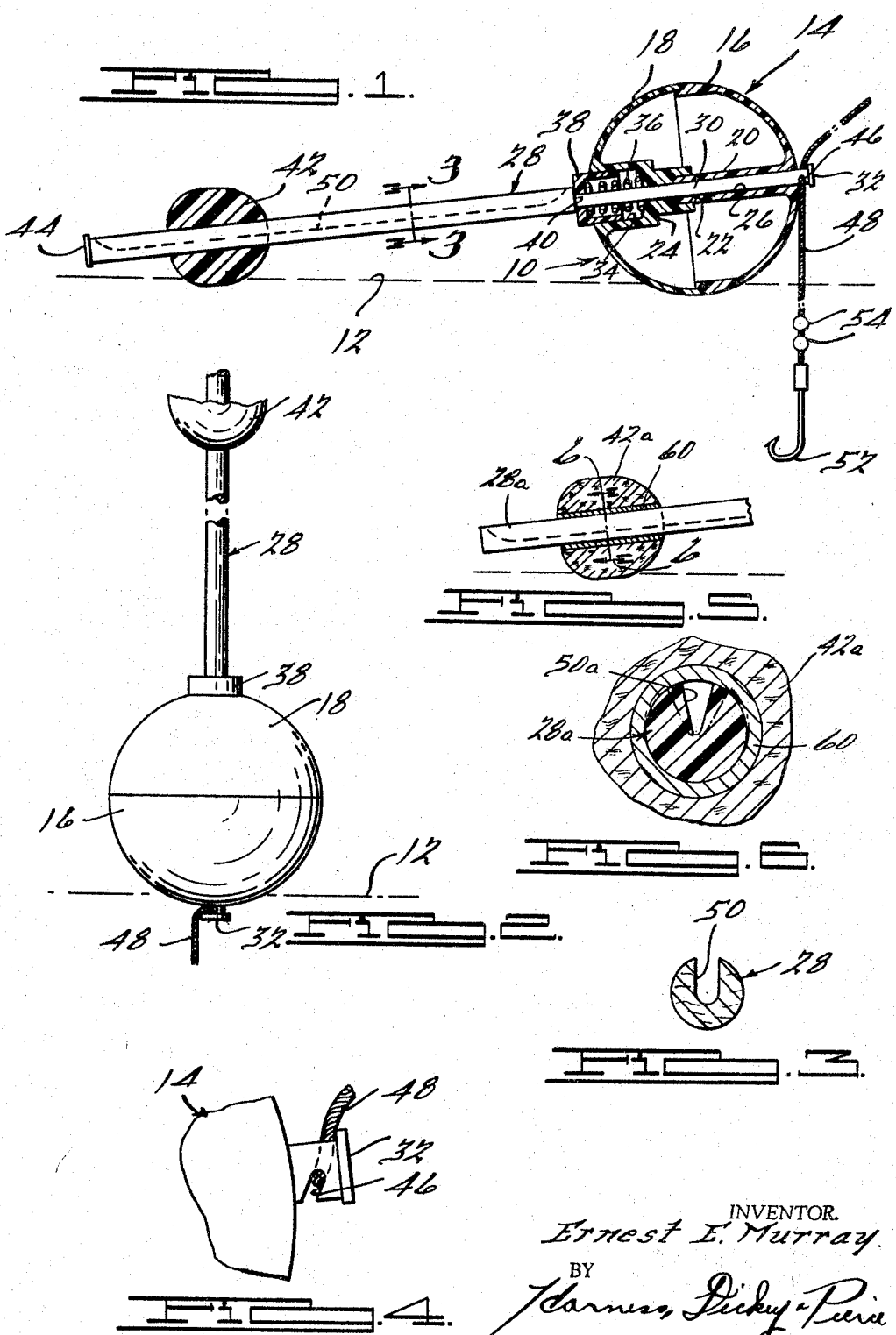
INVENTOR.
Ernest E. Murray
BY
Barnes, Dickey & Pierce
ATTORNEYS

United States Patent Office 3,323,247
Patented June 6, 1967

3,323,247
FISHING BOBBER
Ernest E. Murray, 6765 Meadowlake,
Birmingham, Mich. 48010
Filed Nov. 5, 1964, Ser. No. 409,059
9 Claims. (Cl. 43—17)

The present invention relates to fishing bobbers.

It is an object of the present invention to provide a new and improved fishing bobber construction.

Other objects, features, and advantages of the present invention will become apparent from the subsequent description and the appended claims, taken in conjunction with the accompanying drawing, in which:

FIGURE 1 is a side elevational view with some parts shown in section of a fishing bobber embodying the features of the present invention;

FIGURE 2 is a side elevational view of the bobber of FIGURE 1 shown in its upright or actuated position;

FIGURE 3 is an enlarged sectional view of the bobber of FIGURE 1 taken substantially along the line 3—3 of FIGURE 1;

FIGURE 4 is an enlarged fragmentary view of the bottom portion of the bobber of FIGURE 1;

FIGURE 5 is a fragmentary view of a modified bobber structure; and

FIGURE 6 is a sectional view to enlarged scale of the stem of FIGURE 5 taken along the line 6—6.

Looking now to the drawing, the bobber of the present invention is generally indicated by the numeral 10 and is generally shown in its normal floating condition upon the surface 12 of the water. The bobber 10 includes a hollow sphere 14 which can be constructed of two hemispheres 16 and 18 which mate together at their outer peripheries to form a watertight closure; the lower hemisphere 16 has a central core portion 20 which is matable within a recess 22 in an enlarged core portion 24 of the upper hemisphere 18. The core portions 20 and 24 together define a through opening 26 in which is slidably located a reduced section portion 30 of a stem 28. The reduced section portion 30 terminates at its lower end in an enlarged head 32 which head 32 is larger than the through bore 26 hence permitting movement of the stem 28 in one direction only. The portion 30 extends through a cuplike member 38 which is matably located within an enlarged recess 34 in the outer end of the core 24 and which engages a shoulder 40 in stem 28. A coil spring member 36 is located within the recess 34 around portion 30 and extends into the confines of the cup 38 and is mounted under a compressive preload whereby the stem 28 is constantly urged outwardly with the head 32 in engagement with the lower hemisphere 16.

The upper portion of the stem 28 has slidably located thereon a counterweight 42 which is made of a floatable material such as cork. The upper end of the stem 28 terminates in an enlarged head portion 44 whereby the counterweight 42 is prevented from falling off. The reduced section portion 30 of the stem 28 is provided with a notch 46 near the head portion 32 for receiving a fishing line 48. The line 48 can be inserted in the notch 46 simply by depressing the stem 28 inwardly against the bias of the spring 36 thereby moving the notch 46 outwardly from within the bore 26 to a position at which the line 48 can be inserted. Upon releasing the stem 28, the spring 36 forces the stem 28 outwardly thereby tightly clamping the line 48 between the reduced section portion 30 of stem and the lower hemisphere 16.

The upper portion of the stem 28 is provided with a longitudinally extending groove 50. While the groove 50 is used to provide a means for expandably holding the counterweight 42 the groove 50 can be used to run a portion of the line 48 therethrough and under the counterweight 42. In the preferred mode of operation, however, the line 48 is not located therein but is oriented in the manner shown in the drawings and as previously described. In one form, the stem 28 is made of a moisture-absorbent material whereby the stem 28 will swell or expand in the water to better grip the counterweight 42 and to prevent its slipping. Another form for holding the counterweight on the stem is shown in FIGURES 5 and 6 where components similar to like components in FIGURES 1-4 have been given the same number with the addition of the subscript "a." The groove 50a in stem 28a is provided to normally open and expand the stem 28a to an enlarged size as indicated by the dotted outline in FIGURE 6. The counterweight 42a is provided with a reinforcing sleeve 60 in its central aperture. The sleeve 60 has an internal diameter less than the enlarged size of the stem 28a such that when the counterweight 42a is located on stem 28a the counterweight 42a is held from slipping by the resilient gripping action of the compressed stem 28a. The depth of the groove 50a, of course, is deep enough to facilitate the resilient gripping action.

In operation, a line 48 with a hook 52 and weights 54 is connected to the lower end of the stem 28 via the groove 46 in the manner previously noted. The construction of the bobber 10 is such that it normally tends to float in the water on its side with the counterweight 42 contacting the surface of the water 12. The force required at the line 48 to place the bobber 10 in its upright position, as shown in FIGURE 2, is dependent upon the distance that the counterweight 42 is located from that portion of the ball 14 which is contacting the surface 12 of the water; the distance from the line 48 in notch 46 to the portion of ball 14 contacting the surface 12 is of course fixed. In addition to the weight of the counterweight 42 there is the force of water tension on the counterweight 42 which must be overcome to upright the bobber 10. With the bobber 10, by moving the counterweight along the stem 28 the force at the line 48 to upright the bobber 10 can be selected; thus the counterweight 42 can be adjusted along the length of the stem 28 to a desired point to just slightly counter the force of the weight 54 and hook 52 tending to upright the bobber 10. Thus the bobber 10 can be adjusted to an extremely sensitive condition or a coarser condition, depending upon the choice of the individual, to indicate the presence of fish at the hook 52.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A fishing bobber comprising: a floatable ball, means for connecting a fishing line at one side of said ball, a stem extending outwardly oppositely from said one side of said ball, a floatable counterweight supported on said stem and being substantially smaller than said ball, means fixing said stem and said ball together for no more than only slight relative translational movement therebetween, means for connecting said counterweight to said stem at selectively variable positions along said stem, said ball and said counterweight being of a size and having a buoyancy to maintain said stem generally above the surface of the water.

2. A fishing bobber comprising: a floatable ball, a stem extending through said ball from one side and extending outwardly oppositely from said one side of said ball, means at the end of said stem at said one side of said ball for connecting a fishing line, a floatable counterweight supported on said stem and being substantially smaller than said ball, means fixing said stem and said ball together for no more than only slight relative translational movement therebetween, means for connecting said coutnerweight to said stem at selectively variable positions along said stem, said ball and said counterweight being of a size and having a buoyancy to maintain said stem generally above the surface of the water.

3. A fishing bobber comprising: a floatable ball, means for connecting a fishing line at one side of said ball, a stem extending outwardly oppositely from said one side of said ball, a floatable counterweight slidably supported on a portion of said stem with a relatively close tolerance fit, and being substantially smaller than said ball, means fixing said stem and said ball together for no more than only slight relative translational movement therebetween, said portion of said stem having a longitudinally extending groove, said ball and said counterweight being of a size and having a buoyancy to maintain said stem generally above the surface of the water.

4. A fishing bobber comprising; a floatable ball, means for connecting a fishing line at one side of said ball, a stem of moisture absorbent material extending through said ball from said one side and extending outwardly oppositely from said one side of said ball, a floatable counterweight slidably supported on a portion of asid stem with a relatively close tolerance fit, and being substantially smaller than said ball, means fixing said stem and said ball together for no more than only slight relative translational movement therebetween, said portion of said stem having a longitudinally extending groove, said ball and said counterweight being of a size and having a buoyancy to maintain said stem generally above the surface of the water.

5. A fishing bobber comprising: a floatable ball, a stem of moisture absorbent material generally fixed to and extending through said ball from one side and extending outwardly oppositely from said one side of said ball, said stem having an enlarged head located proximate said one side of said ball, spring means connected between said ball and said stem for urging said head against said one side of said ball, means at said enlarged head end of said stem for receiving a fishing line, a floatable counterweight slidably supported on a portion of said stem with a relatively close tolerance fit and being substantially smaller than said ball, said portion of said stem having a longitudinally extending groove whereby radial expansion of said stem from moisture absorption is facilitated and a tight fit assured between said portion of said stem and said counterweight, said ball and said counterweight being of a size and having a buoyancy to maintain said stem generally above the surface of the water.

6. A fishing bobber comprising a floatable ball, means for connecting a fishing line at one side of said ball, a stem extending outwardly oppositely from said one side of said ball, a floatable counterweight supported on said stem and being substantially smaller than said ball, means for connecting said counterweight to said stem at selectively variable positions along said stem, means fixing said stem and said ball together for no more than only slight relative translational movement therebeween, means on said stem for resiliently connecting said counterweight to said stem at selectively variable positions along said stem, said ball and said counterweight being of a size and having a buoyancy to maintain said stem generally above the surface of the water.

7. A fishing bobber comprising: a floatable ball, means for connecting a fishing line at one side of said ball, a stem extending outwardly from an opposite side of said ball, a floatable counterweight being substantially smaller than said ball and slidably supported on a portion of said stem with said portion of said stem extending through an opening in said counterweight, means fixing said stem and said ball together for no more than only slight relative translational movement therebetween, said portion of said stem having a normal section larger than said opening and having a longitudinal groove of a sufficient depth to facilitate reduction of said section to fit said opening and to resiliently grip said counterweight, said ball and said counterweight being of a size and having a buoyancy to maintain said stem generally above the surface of the water.

8. A fishing bobber comprising: a floatable ball, means for connecting a fishing line at one side of said ball, a stem extending outwardly from an opposite side of said ball, a floatable counterweight being substantially smaller than said ball and slidably supported on a portion of said stem with said portion of said stem extending through an opening in said counterweight, a reinforcing sleeve located in said opening, means fixing said stem and said ball together for no more than only slight relative translational movement therebetween, said portion of said stem having a normal section larger than said sleeve opening and having a longitudinal groove of a sufficient depth to facilitate reduction of said section to fit said sleeve opening and to resiliently grip said counterweight, said ball and said counterweight being of a size and having a buoyancy to maintain said stem generally above the surface of the water.

9. A fishing bobber comprising: a floatable ball, a stem of moisture absorbent material generally fixed to and extending through said ball from one side and extending outwardly oppositely from said one side of said ball, said stem having an enlarged head located proximate said one side of said ball, spring means connected between said ball and said stem for urging said head against said one side of said ball, means at said enlarged head end of said stem for receiving a fishing line, a floatable counterweight being substantially smaller than said ball and slidably supported on a portion of said stem with said stem portion of said stem extending through an opening in said counterweight, said portion of said stem having a normal section larger than said opening and having a longitudinal groove of a sufficient depth to facilitate reduction of said section to fit said opening and to resiliently grip said counterweight, said ball and said counterweight being of a size and having a buoyancy to maintain said stem generally above the surface of the water.

References Cited
UNITED STATES PATENTS

| | | | |
|---|---|---|---|
| 1,317,496 | 9/1919 | Hessler | 43—17 |
| 2,181,458 | 11/1939 | La Gue | 43—44.87 |
| 2,493,971 | 1/1950 | Johnson | 43—17 X |
| 2,547,308 | 4/1951 | Dean | 43—17 |
| 2,598,378 | 5/1952 | Hodges | 43—44.92 |
| 2,867,936 | 1/1959 | Lambach | 43—44.95 |
| 2,962,831 | 12/1960 | Cameron | 43—17 |

FOREIGN PATENTS

| | | |
|---|---|---|
| 820,704 | 8/1937 | France. |
| 924,997 | 5/1963 | Great Britain. |

SAMUEL KOREN, *Primary Examiner.*

D. J. LEACH, *Assistant Examiner.*